US010664940B2

(12) United States Patent
Reed et al.

(10) Patent No.: US 10,664,940 B2
(45) Date of Patent: *May 26, 2020

(54) SIGNAL ENCODING TO REDUCE PERCEPTIBILITY OF CHANGES OVER TIME

(71) Applicant: Digimarc Corporation, Beaverton, OR (US)

(72) Inventors: Alastair M. Reed, Lake Oswego, OR (US); Ravi K. Sharma, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/242,805

(22) Filed: Jan. 8, 2019

(65) Prior Publication Data

US 2019/0279328 A1   Sep. 12, 2019

Related U.S. Application Data

(63) Continuation of application No. 15/650,597, filed on Jul. 14, 2017, now Pat. No. 10,176,545, which is a (Continued)

(51) Int. Cl.
*G06K 9/00* (2006.01)
*G06T 1/00* (2006.01)

(52) U.S. Cl.
CPC ............... *G06T 1/005* (2013.01); *G06K 9/00* (2013.01); *G06T 1/00* (2013.01); *G06T 1/0021* (2013.01);
(Continued)

(58) Field of Classification Search
CPC ......... G06T 1/005; G06T 1/0021; G06T 1/00; G06T 1/0085; G06T 2201/0065; G06T 2201/0051; G06K 9/00; G06K 2209/01
(Continued)

(56) References Cited

U.S. PATENT DOCUMENTS 5,790,703 A   8/1998   Wang
5,835,639 A   11/1998  Honsinger
(Continued)

FOREIGN PATENT DOCUMENTS

WO   9953428 A1   10/1999
WO   0007356 A2   2/2000
(Continued)

OTHER PUBLICATIONS

Chu, et al., "Luminance channel modulated watermarking of digital images," SPIE vol. 3723 (1999) . . (9 pages).
(Continued)

*Primary Examiner* — Ali Bayat
(74) *Attorney, Agent, or Firm* — Digimarc Corporation

(57) ABSTRACT

The present disclosures relates generally to digital watermarking and data hiding. One claim recites a smartphone comprising: a camera to capture video of a display that is rendering video, in which the video comprises a first watermark signal embedded in a first portion of the data, a second watermark signal embedded in a second portion of the data, and a third watermark signal embedded in a third portion of the data, in which at least two of the first watermark signal, second watermark signal and third watermark signal are inversely related to one another; electronic memory for buffering data representing captured video; one or more electronic processors programmed for: applying a first perspective distortion to the data representing the captured video to yield first perspective distorted video; and analyzing the first perspective distorted video to detect digital watermarking, in which a second perspective distortion is applied to the data representing the captured video to yield second perspective distorted video when the analyzing does not detect digital watermarking, and then performing analyzing the second perspective distorted video to detect
(Continued)

digital watermarking. Of course, other claims are provided too.

16 Claims, 10 Drawing Sheets

Related U.S. Application Data continuation of application No. 14/637,121, filed on Mar. 3, 2015, now Pat. No. 9,710,870, which is a continuation of application No. 13/894,282, filed on May 14, 2013, now Pat. No. 8,971,567, which is a continuation-in-part of application No. 13/042,212, filed on Mar. 7, 2011, now Pat. No. 8,477,990.

(60) Provisional application No. 61/311,218, filed on Mar. 5, 2010.

(52) U.S. Cl.
CPC .... *G06T 1/0085* (2013.01); *G06T 2201/0051* (2013.01); *G06T 2201/0065* (2013.01)

(58) Field of Classification Search
USPC .......................................................... 382/100
See application file for complete search history.

(56) References Cited

U.S. PATENT DOCUMENTS

| | | |
|---|---|---|
| 5,848,155 A | 12/1998 | Cox |
| 5,862,260 A | 1/1999 | Rhoads |
| 5,949,055 A | 9/1999 | Fleet |
| 5,991,426 A | 11/1999 | Cox |
| 6,052,486 A | 4/2000 | Knowlton |
| 6,108,434 A | 8/2000 | Cox |
| 6,122,403 A | 9/2000 | Rhoads |
| 6,311,214 B1 | 10/2001 | Rhoads |
| 6,332,031 B1 | 12/2001 | Rhoads |
| 6,345,104 B1 | 2/2002 | Rhoads |
| 6,360,000 B1 | 3/2002 | Collier |
| 6,408,082 B1 | 6/2002 | Rhoads |
| 6,449,377 B1 | 9/2002 | Rhoads |
| 6,571,144 B1 | 5/2003 | Moses |
| 6,590,996 B1 | 7/2003 | Reed |
| 6,614,914 B1 | 9/2003 | Rhoads |
| 6,718,046 B2 | 4/2004 | Reed |
| 6,728,390 B2 | 4/2004 | Rhoads |
| 6,738,744 B2 | 5/2004 | Kirovski |
| 6,763,123 B2 | 7/2004 | Reed |
| 6,788,801 B2 | 9/2004 | Liao |
| 6,891,959 B2 | 5/2005 | Reed |
| 6,901,236 B2 | 5/2005 | Saitoh |
| 6,912,295 B2 | 6/2005 | Reed |
| 6,947,571 B1 | 9/2005 | Rhoads |
| 7,027,614 B2 | 4/2006 | Reed |
| 7,068,297 B2 | 6/2006 | Jones |
| 7,116,781 B2 | 10/2006 | Rhoads |
| 7,203,355 B2 | 4/2007 | Levi |
| 7,218,751 B2 | 5/2007 | Reed |
| 7,227,671 B2 | 6/2007 | Zolla |
| 7,391,880 B2 | 6/2008 | Reed |
| 7,446,891 B2 | 11/2008 | Haas |
| 7,738,673 B2 | 6/2010 | Reed |
| 7,970,167 B2 | 6/2011 | Rhoads |
| 7,991,157 B2 | 8/2011 | Rhoads |
| 7,995,790 B2 | 8/2011 | Reed |
| 8,027,506 B2 | 9/2011 | Rhoads |
| 8,027,509 B2 | 9/2011 | Reed |
| 8,050,452 B2 | 11/2011 | Bradley |
| 8,050,465 B2 * | 11/2011 | Ianculescu ......... G06K 9/00228 382/118 |
| 8,094,869 B2 | 1/2012 | Reed |
| 8,103,877 B2 | 1/2012 | Hannigan |
| 8,165,342 B2 | 4/2012 | Reed |
| 8,171,567 B1 * | 5/2012 | Fraser ................... G06T 1/0021 726/32 |
| 8,175,617 B2 | 5/2012 | Rodriguez |
| 8,199,969 B2 | 6/2012 | Reed |
| 8,243,980 B2 | 8/2012 | Rhoads |
| 8,280,103 B2 | 10/2012 | Petrovic |
| 8,355,514 B2 | 1/2013 | Rhoads |
| 8,412,577 B2 | 4/2013 | Rodriguez |
| 8,477,990 B2 | 7/2013 | Reed |
| 8,509,472 B2 | 8/2013 | Rodriguez |
| 8,533,481 B2 | 9/2013 | Petrovic |
| 8,744,120 B2 | 6/2014 | Reed |
| 8,971,567 B2 | 3/2015 | Reed |
| 9,672,510 B2 * | 6/2017 | Roach ................. G06Q 20/042 |
| 9,710,870 B2 | 7/2017 | Reed |
| 10,176,545 B2 | 1/2019 | Reed |
| 2001/0032315 A1 | 10/2001 | Van |
| 2002/0002679 A1 * | 1/2002 | Murakami ............. G06K 9/522 713/176 |
| 2002/0067844 A1 | 6/2002 | Reed |
| 2004/0228502 A1 | 11/2004 | Bradley |
| 2005/0031159 A1 | 2/2005 | Rhoads |
| 2006/0008112 A1 | 1/2006 | Reed |
| 2006/0115110 A1 | 6/2006 | Rodriguez |
| 2007/0196024 A1 | 8/2007 | Tian |
| 2008/0298632 A1 | 12/2008 | Reed |
| 2010/0013927 A1 * | 1/2010 | Nixon ..................... G01C 11/06 348/144 |
| 2010/0150396 A1 | 6/2010 | Reed |
| 2010/0150434 A1 | 6/2010 | Reed |
| 2010/0322467 A1 | 12/2010 | Reed |
| 2011/0098029 A1 | 4/2011 | Rhoads |
| 2012/0076344 A1 | 3/2012 | Reed |
| 2012/0099758 A1 | 4/2012 | Reed |
| 2012/0099759 A1 | 4/2012 | Reed |
| 2013/0085935 A1 | 4/2013 | Nepomniachtchi |
| 2014/0032406 A1 | 1/2014 | Roach |
| 2017/0270508 A1 * | 9/2017 | Roach ................. G06Q 20/042 |

FOREIGN PATENT DOCUMENTS

| | | |
|---|---|---|
| WO | 0171960 A1 | 9/2001 |
| WO | 02089056 A1 | 11/2002 |
| WO | 2013067439 A1 | 5/2013 |

OTHER PUBLICATIONS

Cox, et. al., "Digital Watermarking," 2002 by Academic Press, pp. 247-252.

Dec. 5, 2012 Notice of Appeal; Jun. 5, 2012 Final Rejection; May 16, 2012 Amendment; and Nov. 16, 2011 Office Action; all from assignee's U.S. Appl. No. 12/337,029. (74 pages).

Lopez de Ipina, TRIP: a Low-Cost Vision-Based Location System for Ubiquitous Computing, Personal and Ubiquitous Computing, vol. 6, No. 3, May 2002, pp. 206-219.

O'Ruanaidh, 'Rotation, Scale and Translation Invariant Digital Image Watermarking,' Signal Processing, pp. 2-15, May 1, 1998.

Szepanski, 'A Signal Theoretic Method for Creating Forgery-Proof Documents for Automatic Verification,' Proceedings 1979 Carnahan Conference on Crime Countermeasures, May 16, 1979, pp. 101-109.

U.S. Appl. No. 61/311,218, filed Mar. 5, 2010. (34 pages).

\* cited by examiner

Fig. 1

```
┌─────────────────────┐          ┌─────────────────────┐
│ Separate an image   │          │ Receive a           │
│ or video into at    │          │ watermarked color   │
│ least two color     │          │ image or video - 11 │
│ planes -10          │          │                     │
└──────────┬──────────┘          └──────────┬──────────┘
           ▼                                ▼
┌─────────────────────┐          ┌─────────────────────┐
│ Determine watermark │          │ Separate the image  │
│ signal for the image│          │ or video into at    │
│ or color planes of  │          │ least two color     │
│ the image - 12      │          │ planes - 13         │
└──────────┬──────────┘          └──────────┬──────────┘
           ▼                                ▼
┌─────────────────────┐          ┌─────────────────────┐
│ Embed the           │          │ Subtract a second   │
│ watermark signal in │          │ color plane from a  │
│ a first color plane │          │ first color plane   │
│ -14                 │          │ - 15                │
└──────────┬──────────┘          └──────────┬──────────┘
           ▼                                ▼
┌─────────────────────┐          ┌─────────────────────┐
│ Embed an inverse    │          │ Detect a watermark  │
│ polarity version of │          │ signal from the     │
│ the watermark signal│          │ result of the       │
│ in a second plane   │          │ subtraction -17     │
│ - 16                │          │                     │
└──────────┬──────────┘          └──────────┬──────────┘
           ▼                                ▼
┌─────────────────────┐          ┌─────────────────────┐
│ Recombine the       │          │ Provide results - 19│
│ watermarked color   │          │                     │
│ planes -18          │          │                     │
└─────────────────────┘          └─────────────────────┘
```

Fig. 10a                                    Fig. 10b

FIG. 12
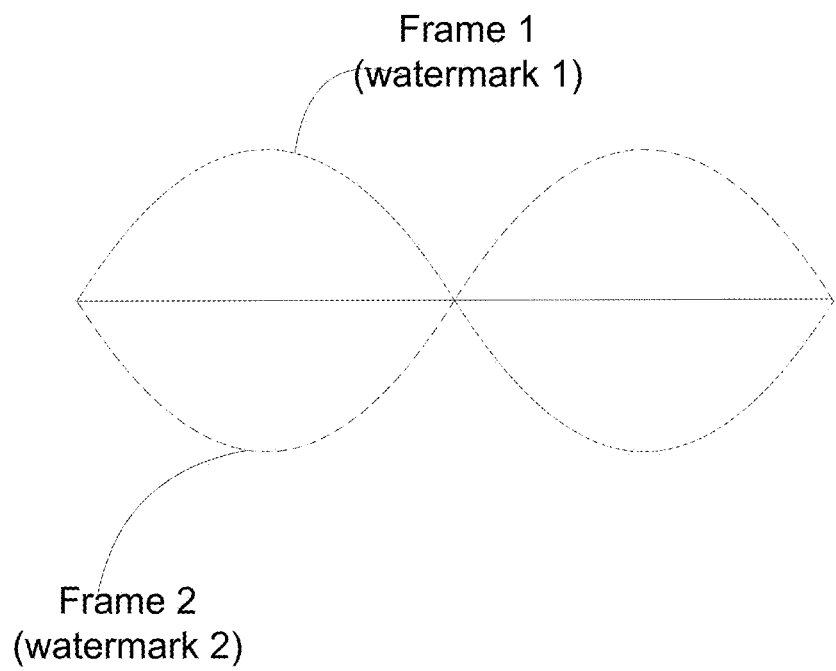
Frame 1 (watermark 1)
Frame 2 (watermark 2)
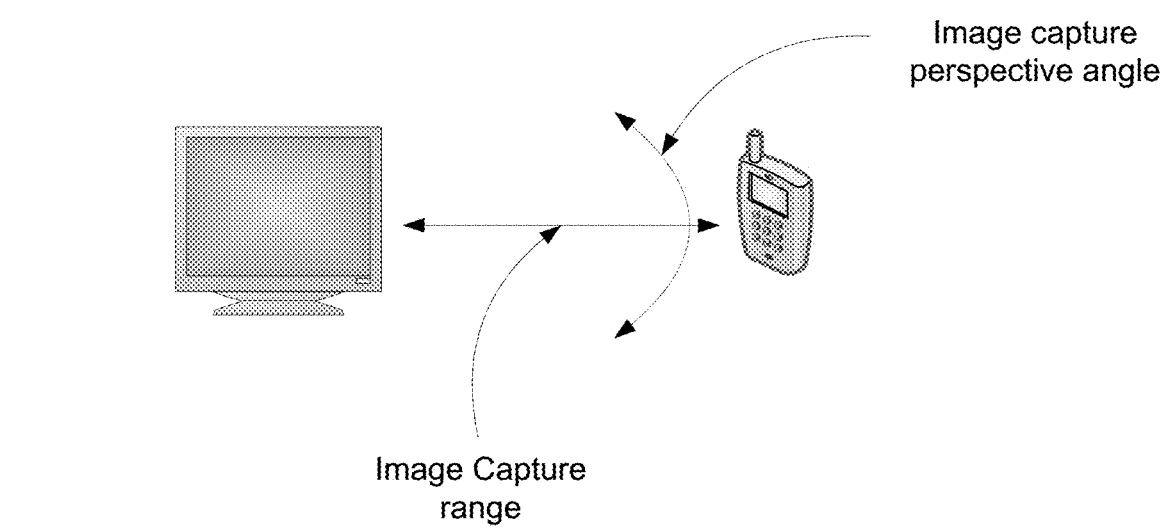
Image capture perspective angle
Image Capture range
FIG. 13

FIG. 14
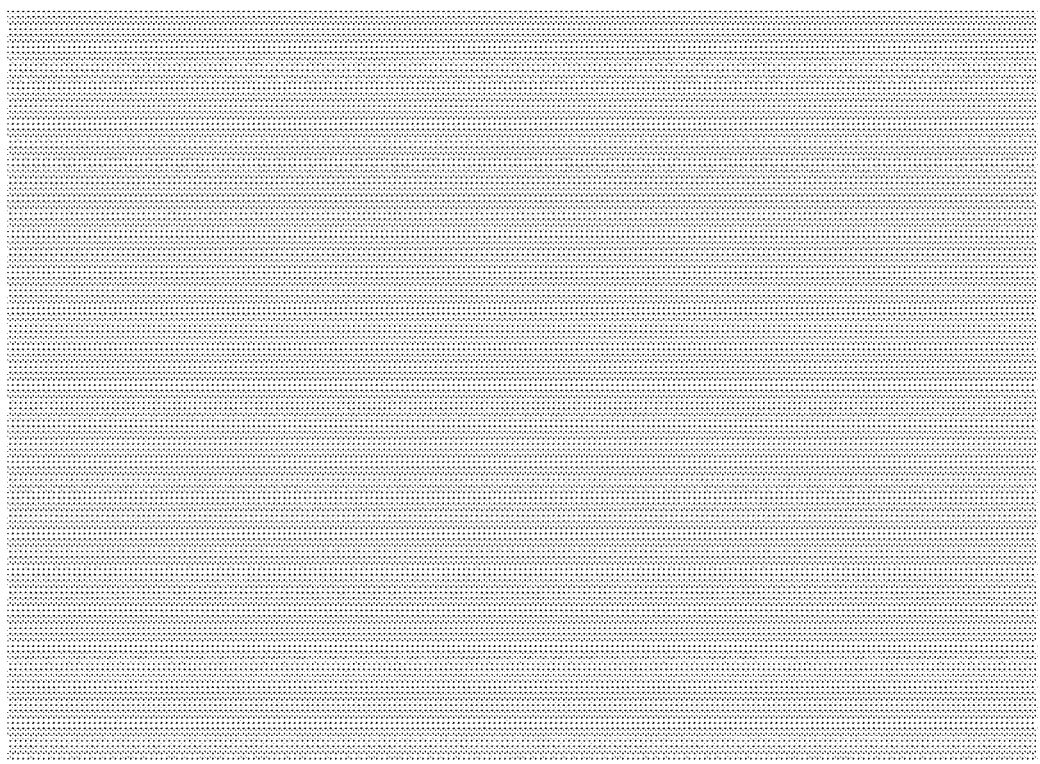
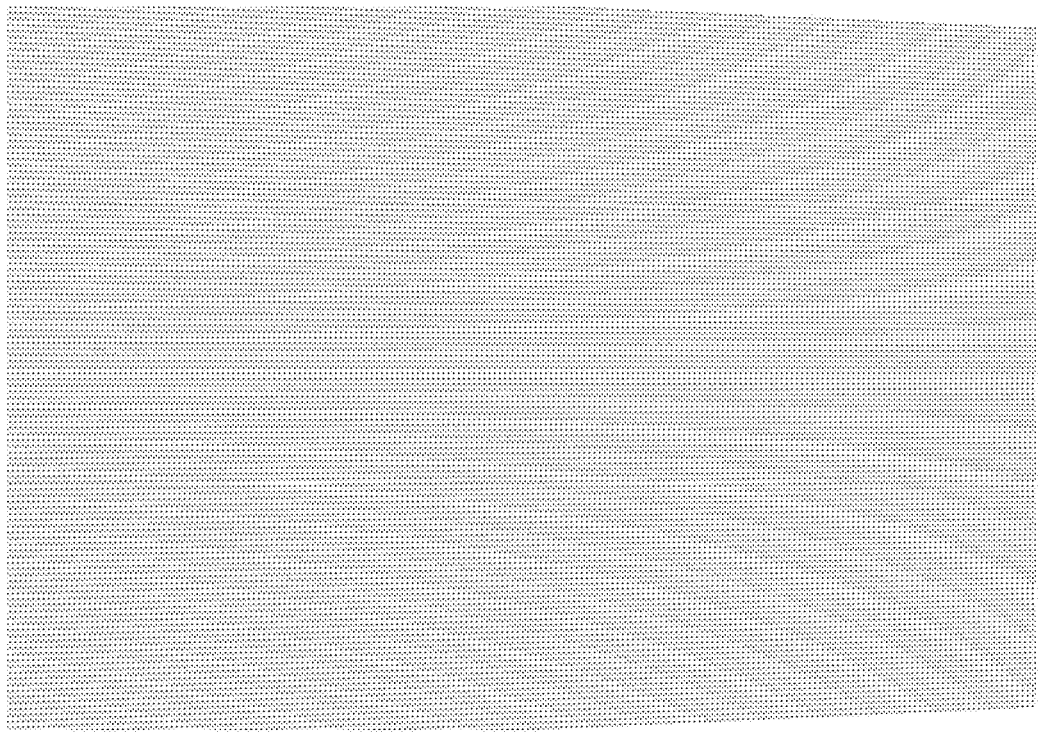
FIG. 15

SIGNAL ENCODING TO REDUCE PERCEPTIBILITY OF CHANGES OVER TIME

RELATED APPLICATION DATA

This application is a continuation of U.S. patent application Ser. No. 15/650,597, filed Jul. 14, 2017 (now U.S. Pat. No. 10,176,545) which is a continuation of U.S. patent application Ser. No. 14/637,121, filed Mar. 3, 2015 (now U.S. Pat. No. 9,710,870) which is a continuation of U.S. patent application Ser. No. 13/894,282, filed May 14, 2013 (now U.S. Pat. No. 8,971,567), which is a continuation in part of U.S. patent application Ser. No. 13/042,212, filed Mar. 7, 2011 (now U.S. Pat. No. 8,477,990), which claims the benefit of U.S. Provisional Application No. 61/311,218, filed Mar. 5, 2010. This application is also related to: U.S. patent application Ser. No. 12/634,505, filed Dec. 9, 2009 (now U.S. Pat. No. 8,199,969); Ser. No. 12/337,029, filed Dec. 17, 2008 (now U.S. Pat. No. 9,117,268); Ser. No. 12/640,386, filed Dec. 17, 2009 (now U.S. Pat. No. 8,175,617); and U.S. Pat. Nos. 7,567,721 and 7,577,841. Each of the above patent documents is hereby incorporated herein by reference in its entirety.

TECHNICAL FIELD

The disclosure relates generally to steganographic data hiding and digital watermarking.

BACKGROUND AND SUMMARY

The term "steganography" generally means data hiding. One form of data hiding is digital watermarking. Digital watermarking is a process for modifying media content to embed a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") may analyze target content to detect whether a watermark is present. In applications where the watermark encodes information (e.g., a message or payload), the reader may extract this information from a detected watermark.

A watermark embedding process may convert a message, signal or payload into a watermark signal. The embedding process may then combine the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of the above patent documents is hereby incorporated by reference herein in its entirety. Of course, a great many other approaches are familiar to those skilled in the art. The artisan is presumed to be familiar with a full range of literature concerning steganography, data hiding and digital watermarking.

One combination recites a method comprising: obtaining data representing video; using one or more electronic processors, embedding a first watermark signal in a first portion of the data, the first watermark signal comprising a first signal polarity; using one or more electronic processors, embedding a second watermark signal in a second portion of the data, the second watermark signal comprising a second signal polarity that is inversely related to the first signal polarity; rendering the watermarked video in real time, in which due to temporal averaging of the first watermark signal and second watermark signal over time, the first watermark signal and the second watermark signal are hidden from a human observer of the video.

Another combination includes a method comprising: obtaining data representing video; using one or more electronic processors, embedding a watermark signal in a first portion of the data, the embedding using a first embedding bump size; using one or more electronic processors, embedding a watermark signal in a second portion of the data, the embedding using a second embedding bump size, in which the first embedding bump size corresponds with a first optimal detection range distance when capturing optical scan data associated with the video as it is being rendered on a display, and the second embedding bump size corresponds with a second, larger optimal detection range distance when capturing optical scan data associated with the video as it is being rendered on the display.

Yet another combination includes a method comprising: obtaining a watermark signal; using one or more programmed electronic processors, embedding a watermark signal in a first portion of a video signal; preconditioning the watermark signal in a first manner to allow expanded detection of said preconditioned watermark signal in the face of first distortion; using one or more programmed electronic processors, embedding the watermark signal preconditioned in the first manner in a second portion of the video signal; preconditioning the watermark signal in a second manner to allow expanded detection of said preconditioned watermark signal in the face of second distortion; using one or more programmed electronic processors, embedding the watermark signal preconditioned in the second manner in a third portion of the video signal.

Still another combination recites a method comprising: receiving data representing video captured from a video display; searching the data for hidden indicia, the indicia providing information to allow a determination of video capture distance and video capture perspective; upon encountering the hidden indicia, using the information to warp the data to compensate for distortion caused by video capture distance or video capture perspective; provided the warped data to an electronic processor programmed as a steganographic indicia decoder, said decoder analyzes the warped data to decode steganographic indicia hidden in video captured from the video display.

On aspect of the disclosure is to facilitate watermark detection from video captured of a monitor or display (e.g., TV, computer monitor, smartphone display, etc.). Watermark detection over wider viewing angles can be obtained by pre-distorting a watermark signal to introduce perspective distortion. For example, let's say the watermark is pre-distorted such that it has a perspective corresponding to a +30 degree horizontal or vertical tilt. With a +30 degree pre-distortion, an image capture at −30 degree horizontal or vertical tilt appears head-on (e.g., no perspective in the video capture), allowing detection to proceed as normal.

Further combinations, aspects, features and advantages will become even more apparent with reference to the following detailed description and accompanying drawing.

BRIEF DESCRIPTION OF THE DRAWINGS

FIG. 1 represents a color image.

FIGS. 10a and 10b are block diagrams showing, respectively, an embedding process and a detection process.

FIG. 12 is a diagram showing inversely related watermark signals in two video frames.

FIG. 13 is a diagram showing image capture of rendered video.

FIG. 14 shows a representation of a watermark signal.

FIG. 15 shows a preconditioned version of the FIG. 14 watermark signal.

DETAILED DESCRIPTION

Some aspects of the following disclosure discuss a digital watermarking technique that utilizes at least two chrominance channels (also called "color planes," "color channels" and/or "color direction"). Chrominance is generally understood to include information, data or signals representing color components of an image or video. In contrast to a color image or video, a grayscale (monochrome) image or video has a chrominance value of zero.

Figure 2:
FIG. 2 represents a first color channel ('a' channel) of the color image representation shown in FIG. 1.
Figure 3:
FIG. 3 represents a second color channel ('b' channel) of the color image representation shown in FIG. 1.

Media content that includes a color image (or color video) is represented in FIG. 1. An industry standard luminance and chrominance color space is called "Lab" (for Lightness (or luminance), plus 'a' and 'b' color channels) that can be used to separate components of images and video. FIG. 2 is an 'a' channel representation of FIG. 1 (shown in grayscale), and FIG. 3 is a 'b' channel representation of FIG. 1 (shown in grayscale). Of course, our inventive methods and apparatus will apply to and work with other color schemes and techniques as well. For example, alternative luminance and chrominance color schemes include "Yuv" (Y=luma, and 'u' and 'v' represent chrominance channels) and "Ycc." (also a dual chrominance space representation).

Figure 4:
FIG. 4 is a representation of the sum of the first color channel of FIG. 2 and the second color channel of FIG. 3 (e.g., a+b).
Figure 5:
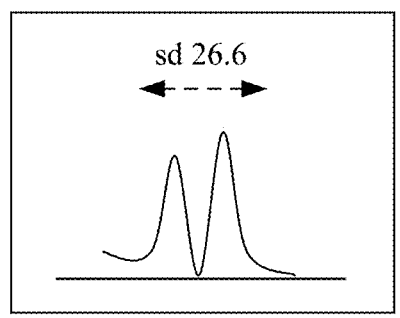
FIG. 5 is a graph showing a histogram standard deviation of FIG. 4.
Figure 6:
FIG. 6 is a representation of the difference between the first color channel of FIG. 2 and the second color channel of FIG. 3 (a−b).
Figure 7:
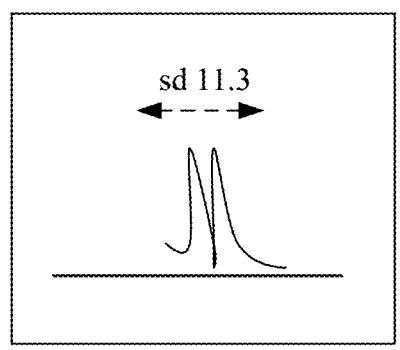
FIG. 7 is a graph showing a histogram standard deviation of FIG. 6.

Let's first discuss the additive and subtractive effects on FIGS. 2 and 3. FIG. 4 illustrates a representation of the result of adding the 'a' channel (FIG. 2) with the 'b' channel (FIG. 3). FIG. 6 illustrates a representation of the result of subtracting the 'b' channel (FIG. 3) from the 'a' channel (FIG. 2). The result of subtracting the 'b' channel from the 'a' channel yields reduced image content relative to adding the two channels since the 'a' and 'b' color planes have correlated image data in the Lab scheme. (In typical natural imagery, the 'a' and 'b' chrominance channels tend to be correlated. That is to say where 'a' increases, 'b' also tends to increase. One measure of this is to measure the histogram of the two chrominance planes when they are added (see FIG. 5), and compare that to the histogram when the two color planes are subtracted (see FIG. 7). The fact that the standard deviation of FIG. 7 is about half that of FIG. 5 also supports this conclusion, and illustrates the reduction in image content when 'b' is subtracted from 'a'.) In this regard, FIG. 4 provides enhanced or emphasized image content due to the correlation. Said another way, the subtraction of the FIG. 3 image from FIG. 2 image provides less image interference or reduces image content. The histogram representations of FIG. 4 and FIG. 6 (shown in FIGS. 5 and 7, respectively) further support this conclusion.

Now let's consider watermarking in the context of FIGS. 2 and 3.

In a case where a media signal includes (or may be broken into) at least two chrominance channels, a watermark embedder may insert digital watermarking in both the 'a' color direction (FIG. 2) and 'b' color direction (FIG. 3). This embedding can be preformed in parallel (if using two or more encoders) or serial (if using one encoder). The watermark embedder may vary the gain (or signal strength) of the watermark signal in the 'a' and 'b' channel to achieve improved hiding of the watermark signal. For example, the 'a' channel may have a watermark signal embedded with signal strength that greater or less than the watermark signal in the 'b' channel. Alternatively, the watermark signal may be embedded with the same strength in both the 'a' and 'b' channels. Regardless of the watermark embedding strength, watermark signal polarity is preferably inverted in the 'b' color plane relative to the 'a' color plane. The inverted signal polarity is represented by a minus ("−") sign in equations 1 and 2.

$$WMa=a(\text{channel})+wm \quad (1)$$

$$WMb=b(\text{channel})-wm \quad (2)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained (from optical scan data, memory, transmission channel, etc.), and data representing the color image is communicated to a watermark detector for analysis. The detector (or a process, processor or electronic processing circuitry used in conjunction with the detector) subtracts WMb from WMa resulting in WMres as shown below:

$$WMres=WMa-WMb \quad (3)$$

$$WMres=(a+wm)-(b-wm) \quad (4)$$

$$WMres=(a-b)+2*wm \quad (5)$$

This subtraction operation yields reduced image content (e.g., FIG. 6) as discussed above. The subtraction or inverting operation of the color channels also emphasizes or increases the watermark signal (2*wm), producing a stronger watermark signal for watermark detection. Indeed, subtracting the color channels increases the watermark signal-to-media content ratio: WMres=(a−b)+2*wm.

Figure 8:
FIG. 8 is an image representation of the difference between the first color channel of FIG. 2 (including a watermark signal embedded therein) and the second color channel of FIG. 3 (including the watermark signal embedded therein).
Figure 9:
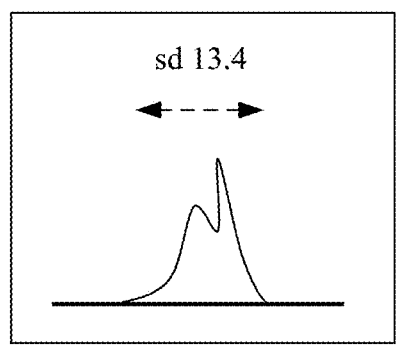
FIG. 9 is a graph showing a histogram standard deviation of FIG. 8.

FIG. 8 illustrates the result of equation 5 (with respect to watermarked versions of FIG. 2 and FIG. 3). As shown, the perceptual "graininess" or "noise" in the image corresponds to the emphasized watermark signal. The image content is also reduced in FIG. 8. A histogram representation of FIG. 8 is shown in FIG. 9 and illustrates a favorable reduction of image content.

A watermark detector may extract or utilize characteristics associated with a synchronization signal (if present) from a frequency domain representation of WMres. The detector may then use this synchronization signal to resolve scale, orientation, and origin of the watermark signal. The detector may then detect the watermark signal and obtain any message or payload carried thereby.

To even further illustrate the effects of improving the watermark signal-to-media content ratio with our inventive processes and systems, we provide some additive and subtractive examples in the content of watermarking.

For the following example, a watermark signal with the same polarity is embedded in each of the 'a' color channel and the 'b' color channel. The same signal polarity is represented by a plus ("+") sign in equations 6 and 7.

$$WMa=a+wm \quad (6)$$

$$WMb=b+wm \quad (7)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained, and data representing the color image is communicated to a watermarked detector for analysis. The detector (or a process, processor, or electronic processing circuitry used in conjunction with the detector) adds the 'a' and 'b' color channels to one another (resulting in WMres) as shown below:

$$WMres=WMa+WMb \quad (8)$$

$$WMres=(a+wm)+(b+wm) \quad (9)$$

$$WMres=(a+b)+2*wm \quad (10)$$

This addition operation results in increased image content (e.g., FIG. 4). Indeed, image interference during watermark detection will be greater since the two correlated 'a' and 'b' color channels tend to reinforce each other.

By way of further example, if WMb is subtracted from WMa (with watermark signals having the same polarity), the following results:

$$WMres=WMa-WMb \quad (11)$$

$$WMres=(a+wm)-(b+wm) \quad (12)$$

$$WMres=(a-b)+\approx 0*wm \quad (13)$$

A subtraction or inverting operation in a case where a watermark signal includes the same polarity decreases image content (e.g., FIG. 4), but also significantly decreases the watermark signal. This may result in poor—if any— watermark detection.

FIGS. 10a and 10b are flow diagrams illustrating some related processes and methods. These processes may be carried out, e.g., via a computer processor, electronic processing circuitry, printer, handheld device such as a smart cell phone, etc.

With reference to FIG. 10a, a color image (or video) is obtained and separated into at least two (2) color channels or planes (10). A watermark signal is determined for the color image or video (12). Of course, the watermark signal for the color image or video may be determined prior to or after color plane separation. The determined watermark signal is embedded in a first of the color planes (14). An inverse polarity version of the watermark signal is embedded in a second color plane. The color planes are recombined (perhaps with data representing luminance) to form a composite color image.

With reference to FIG. 10b, a watermarked color image or video is obtained or received (11). The color image (or video) has or can be separated into at least two (2) color planes or channels (13). A first color plane includes a watermark signal embedded therein. A second color plane includes the watermark signal embedded therein with a polarity that is inversely related to the watermark signal in the first color plane. The watermarked second color plane is subtracted from the watermarked first color (15). The result of the subtraction is analyzed to detect the watermark signal. A detected watermark message, signal or payload can be provided (19), e.g., to a remote database to obtain related metadata or information, to a local processor, for display, to a rights management system, to facilitate an online transaction, etc.

In addition to the Lab color scheme discussed above, a watermark signal may be embedded in color image (or video) data represented by RGB, Yuv, Ycc, CMYK or other color schemes, with, e.g., a watermark signal inserted in a first chrominance direction (e.g., red/green direction, similar to that discussed above for the 'a' channel) and a second chrominance direction (e.g., a blue/yellow direction, similar to that discussed above for the 'b' channel). For watermark signal detection with an alterative color space, e.g., an RGB or CMYK color space, an image can be converted to Lab (or other color space), or appropriate weights of, e.g., RGB or CMY channels, can be used. For example, the following RGB weights may be used to calculate 'a'–'b': Chrominance Difference=0.35*R−1.05*G+0.70*B+128, where R, G and B are 8-bit integers.

Further Considerations of Video

The human contrast sensitivity function curve shape with temporal frequency (e.g., relative to time) has a very similar shape to the contrast sensitivity with spatial frequency.

Successive frames in a video are typically cycled at about at least 60 Hz to avoid objectionable visual flicker. So-called "flicker" is due to the high sensitivity of the human visual system (HVS) to high temporal frequency changes in luminance. The human eye is about ten (10) times less sensitive to high temporal frequency chrominance changes.

Figure 11:
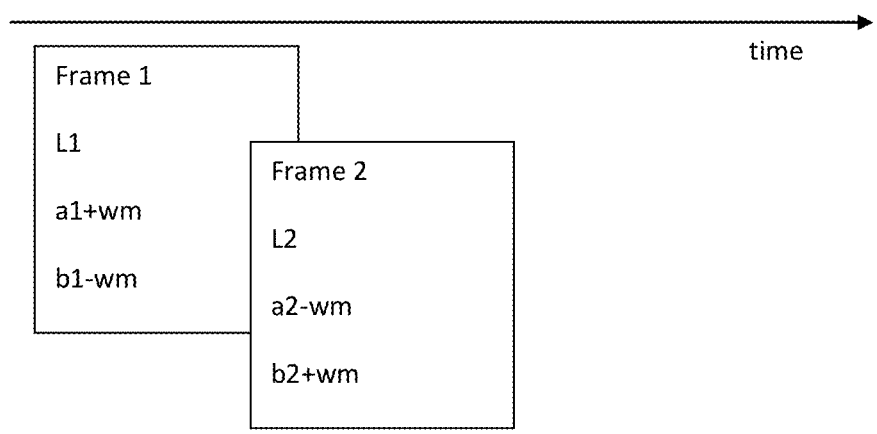
FIG. 11 is a diagram showing watermarks embedded in first and second video frames.

Consider a video sequence with frames as shown in FIG. 11. A chrominance watermark can be added to frame 1 per the above description for images. In a similar way, a watermark is added to frame 2 but the polarity is inverted as shown in FIG. 11.

In order to recover the watermark, pairs of frames are processed by a watermark detector, and the 'a' channels are subtracted from each other as shown below.

$$\text{Det}\_a = (a1 + wm) - (a2 - wm) = (a1 - a2) + 2*wm \qquad (14)$$

Det_a refers to watermark detection processing of the 'a' channel. Because of the temporal correlation between frames, the image content in equation 14 is reduced while the watermark signal is reinforced.

In a similar way the 'b' channels are also subtracted from each other $$\text{Det}\_b = (b1 - wm) - (b2 + wm) = (b1 - b2) - 2*wm \qquad (15)$$

Det_a refers to watermark detection processing of the 'b' channel. Equation 14 and 15 are then subtracted from each other as shown below in equation 16.

$$\text{Det}\_a - \text{Det}\_b = (a1 - a2 + 2*wm) - (b1 - b2 - 2*wm) \qquad (16)$$
$$= (a1 - a2) - (b1 - b2) + 4*wm$$

In general, related (but not necessarily immediately adjacent) frames will have spatially correlated content. Because of the spatial correlation between the 'a' and 'b' frames, the image content is reduced while the watermark signal is reinforced. See equation 16.

For any one pair of frames selected by a watermark detector, the polarity of the watermark could be either positive or negative. To allow for this, the watermark detector may examine both polarities.

The linear transform (rotation, scale, differential scale, shear) estimation process at the detector will be unaffected by inversion (e.g., the subtraction in the above equations). If translation is estimated in a watermark detection process, an inverted watermark (e.g., negative signal) may include a phase rotation of 180 degrees. Once an inverted state is determined during translation estimation, the message recovery can be performed in an inverted state. Frames of mixed polarity may benefit from special processing at the detector. In these cases, smaller image regions containing the watermark can be tested for both signal polarities before combining watermark signal information from such regions.

Improving Watermark Imperceptibility

With reference to FIG. 12, two watermark signals (or components), $W_1$ and $W_2$, are shown relative to two video frames ($f_1$ and $f_2$) over time. Of course, video will likely include many more frames, and illustration of just a portion of such frames is not intended to be limiting.

$W_1$ and $W_2$ preferably carry the same payload or message. In terms of signal characteristics, however, $W_1$ and $W_2$ are preferably inversely related to one another. For example, their signal polarity is inversely related. Instead of two (2) watermark signals, a single watermark signal can be used. When using a single signal, however, the signal polarity is preferably inversely alternated between video frames.

The human eye performs temporal averaging of the watermark signals $W_1$ and $W_2$ as they are rendered for viewing. That is, when looking at sequential presentment of frames f1 and f2, the human eye/mind averages the two signals, effectively canceling them out, since they include inversely related polarities. Another way to view this effect is to consider signal adjustments or "tweaks". Recall from above that a digital watermark signal can be introduced into media content by altering data representing audio or video or imagery. If $W_1$ introduces a positive (+) tweak or alteration in f1, then to achieve the favorable temporal averaging, $W_2$ preferably introduces a corresponding negative (−) tweak or alteration in f2. These changes are preferably consistent from the first frame to the second frame. That is, if watermark changes are introduced to a first spatial area (or first set of coefficients) in the first frame, an inverse change is made to a corresponding spatial area (or coefficients) in the second frame.

Thus, the perceived perceptibility with temporal averaging=$W_1 - W_2 \approx 0$.

A programmed electronic processor (or multiple processors) embeds video accordingly.

A watermark detector is used to read the watermarking as watermarked video is rendered. For example, the watermarked video is rendered on a display such as a computer monitor, TV or cell phone display (e.g., Apple's iPhone). A camera or video camera can be used to capture imagery (e.g., streaming mode capture). Captured imagery is provided to a watermark detector which analyses captured imagery. For example, the watermark detector may analyze a single video frame (e.g., a positively (+) embedded image frame) to decode the watermarking therefrom, or from combined frames (e.g., equations (10), (14) and (16)) as discussed above.

A mobile device (e.g., an iPhone) executing a watermark detector application may be used for such a watermark detector. Mobile devices are increasingly shipped with high quality video cameras. Of course, there are many other suitable devices besides the iPhone that can serve as watermark detectors.

Additional methods are now provided to improve a user's experience when trying to read a watermark from displayed or rendered video.

A user points a camera (e.g., included in a mobile device such as the iPhone) at a display and starts video capture (see FIG. 13). There is typically a "sweet" spot in terms of image capture distance and image capture perspective angle to position the camera relative to the display to avoid positional distortion. If the camera is positioned too far away or at too great an angle relative to the display then the watermarking may not be detectable. Distance and angle introduce signal distortion (e.g., scale, rotation, translation) which may deter watermark reading.

One approach is to increase a watermark's tolerance to image capture range and perspective angle. A watermark can be adjusted to increase detection tolerances. For example, an embedding area or "bump" can be adjusted to allow for increased image capture range. (An embedding area or bump refers to a host signal area or other characteristics at which a signal alteration is introduced to represent at least some portion of a watermark signal.)

If an embedding bump covering a 2×2 pixel area (4 pixels) corresponds to a sweet spot range of 4-8 inches, then doubling the bump size eight pixels to will increase the sweet spot range to about 16 inches. (The specific number and embedding details are not intended to be limiting, and are provided as examples only.)

Multiple bump sizes can be used when embedding watermarking in a video sequence to provide an extended image capture range. For example, consider the following frames and bump sizes:

| Frame 1 | Frame 2 | Frame 3 | Frame 4 | Frame 5 | Frame 6 | Frame 7 | Frame 8 |
|---|---|---|---|---|---|---|---|
| Bump 1 | Bump 1 | Bump 2 | Bump 2 | Bump 1 | Bump 1 | Bump 2 | Bump 2 |

A first pair of frames is embedded at a first bump size, and a second pair of frames is embedded at a second bump size, and so on. This will allow an extended image capture range corresponding to both bump sizes as the video is rendered. At a frame rate of 25 frames/second or higher (e.g., 60 frames/second or higher), the user will experience quicker detection rates and lower frustration as she positions the camera relative to the display.

Of course, three or more embedding bump sizes may be used to even further extend the image capture range. And, three or more frames may be grouped together instead of using pairs.

Now let's consider image capture perspective (see FIG. 13). The ideal image capture would likely be a parallel vantage point directly in front of the display screen. But the ideal is not always possible. For example, a user may hold their camera at an angle relative to the display when capturing video of the display. This may introduce distortion which may hamper watermark detection.

One approach is to precondition the watermark signal to allow for a wider range of perspective angle image capture while still allowing for watermark detection. For example, if a watermark signal can typically be read over the range of +/−5 degrees perspective angle distortion, preconditioning the watermark signal prior to embedding to +/−10 degrees on some video frames allows the image capture perspective range to be extended to approximately +/−15 degrees. For example a perspective filter can be set to a certain horizontal perspective, and the watermark signal may be passed through the filter.

By way of example, please consider a watermark signal represented by a set of, e.g., horizontal lines as shown in FIG. 14. This signal is taken and preconditioned to approximate a horizontal distortion of −10 degrees as shown in FIG. 15. When this preconditioned watermark signal is viewed by a camera at a perspective angle of +10 degrees, the resultant captured image approximates the original signal in FIG. 14. That is, the preconditioning coupled with an off-center read effectively cancels out the perspective angle distortion.

By way of example, this precondition can be alternated in frames as shown below:

| Frame 1 | Frame 2 | Frame 3 | Frame 4 | Frame 5 | Frame 6 | Frame 7 | Frame 8 |
|---|---|---|---|---|---|---|---|
| No change | No change | −10 degrees | −10 degrees | +10 degrees | +10 degrees | No change | No change |

A first pair of frames is embedded without any preconditioning, a second pair of frames is embedded with a precondition signal at −10 degrees perspective, and a third pair of frames is embedded with a preconditioned signal at +10 degrees perspective, and so on. This will allow an extended image capture perspective angle range as the video is rendered. At a frame rate of 25 frames/second or higher, the user will experience quicker detection rates and lower frustration as she positions the camera relative to the display.

Of course, additional angle preconditioning can be used, with different embedding intervals, over a different number of frame pairs/triplets/quads, etc. as well. Also, while we have used ±10 degrees, the preconditioning can cover a range of values, e.g., over ±5±20 degrees.

Moreover, both perspective preconditioning and embedding bump sizes can be combined to yield both increased range and perspective changes. For example:

| 1$^{st}$ Frame Pair | 2$^{nd}$ Frame Pair | 3$^{rd}$ Frame Pair | 4$^{th}$ Frame Pair | 5$^{th}$ Frame Pair | 6$^{th}$ Frame Pair |
|---|---|---|---|---|---|
| Bump size 1; No precondition | Bump size 1; +10 degrees precondition | Bump size 1; −10 degrees precondition | Bump size 2; No precondition | Bump size 2; +10 degrees precondition | Bump size 1; −10 degrees precondition |

Of course, other combinations involving both bump size and horizontal and/or vertical preconditions can be used as well. In some cases the so-called "I" frames are used as a starting reference for bump size and/or preconditioning. Sequences can be renewed or altered when an I frame is encountered.

Smoother transitions over angles and scales can be used to even further improve detection. For example, detection over viewing angles and scales can be obtained by cycling through a discrete set of pre-distortions—negative horizontal to positive horizontal (e.g. −60, −30, 0, +30, +60), negative vertical to positive vertical, and over scale as well. We can even use smaller steps in pre-distortion to help facilitate a smooth transition and reduce potential gaps in detection when a detecting device is between a discrete step, and to help reduce any residual visibility impact when switching from one pre-distortion to the next. Although use of polarity reversals and higher frame rates reduce visibility, the boundary frames between two pre-distortions can be different, and in this case the watermark signal may show up in the form of a slight flicker. Using a smoother transition (e.g., smaller step sizes) of angles (e.g., −60 to +60 in steps of 10-5 degrees or even less) and scales can address both these issues. In another implementation, pre-distortion step sizes change between pair frames according with a smooth function, e.g., such as a sine wave.

Based on the disclosure in this patent document, watermark detection over wider viewing angles can be obtained by pre-distorting a watermark signal to introduce perspective distortion. For example, let's say the watermark signal is pre-distorted such that it has a perspective corresponding to a +30 degree horizontal tilt. With a +30 degree pre-distortion, video capture at −30 degree horizontal tilt appears head-on (e.g., no perspective angle), allowing watermark detection to proceed as normal. But in the +30 degree pre-distortion, one edge of the watermark signal (e.g., if represented as a "tile" as in FIG. 15) may be closer to the viewer than the other edge (due to the nature of the perspective transform). In other words, if the center of the watermark tile is assumed to be at scale 1, one edge of the tile can be at a scale greater than 1 and the other edge can be at a scale less than 1. We can use both upsampling and downsampling when introducing the pre-distortion to compensate for the different scales at different watermark signal areas or edges. In some cases, a different set of filters can be employed in the upsampling and downsampling regions.

Various elements of a psychovisual system (generically referred to as a PVS in FIG. 17) can be applied to the watermark signal itself, both the original watermark and/or the pre-distorted version(s). A PVS may include visibility models, contrast sensitivity functions, masking, attention models (e.g., saliency model), and embedding-in-loop with image quality metrics as objective functions. Output from the PVS may include a mask to help guide watermark embedding. E.g., the mask may indicate which portions of the watermark signal should be more or less heavily emphasized by the watermark embedder. The PVS may also analyze the video and provide a mask for the watermark signal itself based on anticipated host features or distortion characteristics.

Figure 17:
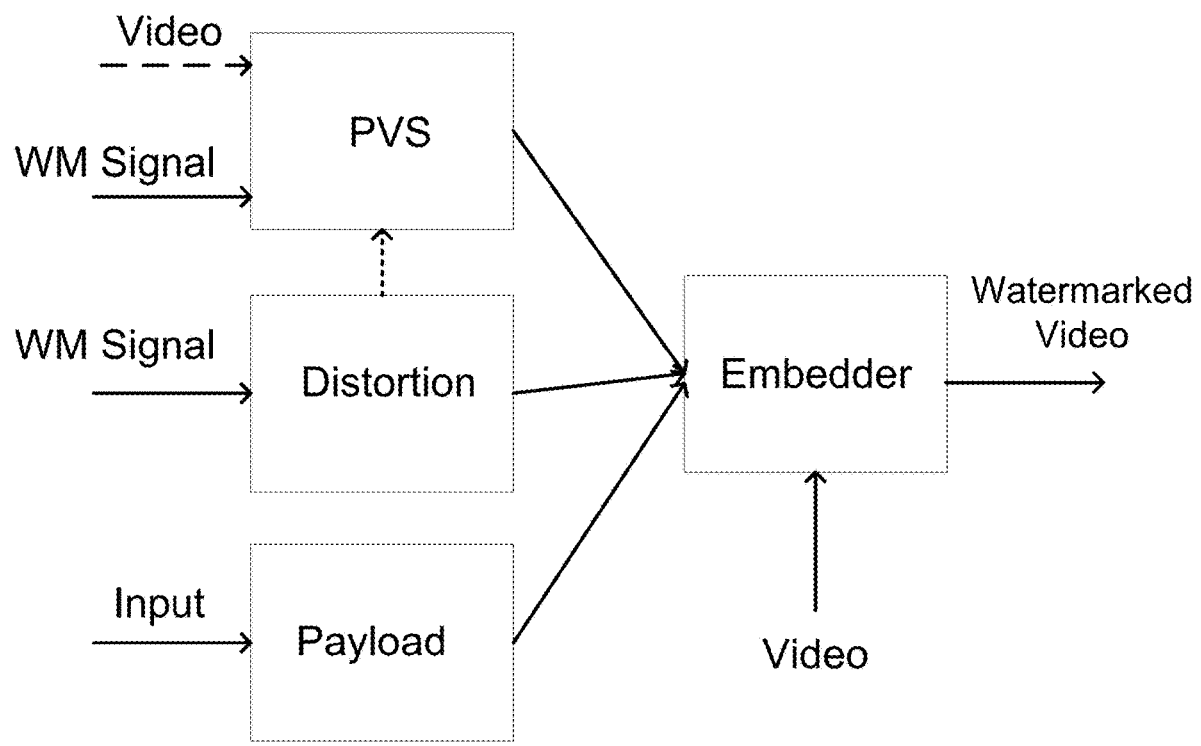
FIG. 17 is a block diagram of an example watermark embedding process.

With reference to FIG. 17, the watermark signal, once pre-distorted may also be feed into the PVS to help adjust or tweak a generate mask. For example, signal distortion may alter the psychovisual system analysis, and a new or modified mask can be produced.

FIG. 17 also shows an input to a payload module. The input may be provided in real-time and, e.g., may be dynamically changed dependent on the content of the video, the location of the video display, the anticipated audience of the video, the purchasing habits of the viewer, etc. The input can be obtained from a network location or from data stored on a local device, and may also convey information to allow a user capturing embedded video to access additional information, facilitate a transaction or to cause an action. Examples of such are provided, e.g., in assignee's U.S. patent application Ser. No. 13/712,609, filed Dec. 12, 2012 (now U.S. Pat. No. 8,498,627) and Ser. No. 13/873,117, filed Apr. 29, 2013 (published as US 2014-0244495 A1). These patent documents are each hereby incorporated herein by reference in their entireties.

In one implementation, a communications session is established with a user via the user's mobile device which captured imagery of a display or monitor, e.g., a session akin to that described in assignee's U.S. Pat. No. 8,412,577, which is incorporated herein by reference in its entirety.

The watermark embedder in FIG. 17 may use some of all information from the PVS, Distortion and Payload modules when embedding a watermark signal in video. The modules shown in FIG. 17 are preferred realized in hardware, although they can be emulated with one or more programmed processors as wells.

The watermark detector may also cooperate with a facial or image recognition module (not pictured in FIG. 17). For example, the display may include or cooperate with a camera. The camera captures imagery and it is provided to the facial or image recognition module. That module identifies a face or image (e.g., a human) and determines a relative perspective angle of such. That perspective angle is provided to the distortion module which adjusts the watermark pre-distortion in anticipation where the face is located relative to the display and, thus, the likely corresponding image capture angle. If the face is located at say +45 degrees, the watermark signal can be distorted at a corresponding −45 degrees to compensate for the anticipated image capture. Similarly, the facial or image recognition module can determine if a person is moving relative to the display and estimate a distortion that will likely compensate for a future image capture location. Assignee's U.S. Pat. No. 8,412,577, which is hereby incorporated herein by reference in its entirety, provides some complementary disclosure in this regard.

When embedding saturated colors, light regions (whites), and dark regions (blacks) can be modified to improve detection and visibility. Whites and saturated colors can be adapted to allow room for introducing both polarities of a polarity-alternating watermark in alternating frames. This can be achieved, e.g., using pre-calculated look-up tables.

Now please consider assume a digital display system where the definition of white is 255, 255, 255 (which corresponds to red (R), green (G) and blue (B) fully on).

Figure 18A:
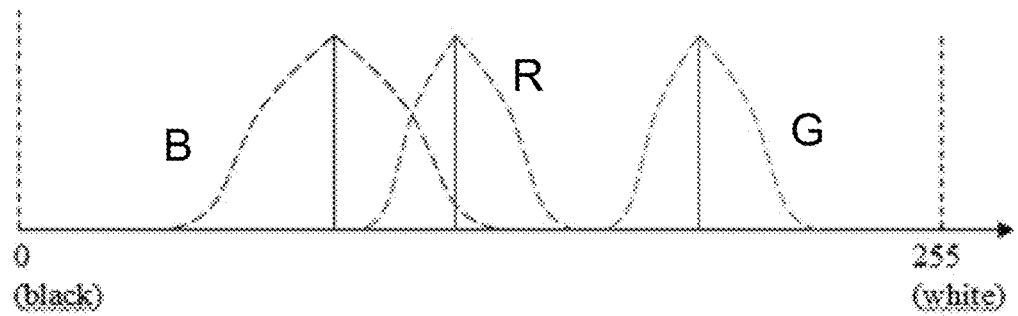
FIG. 18a is a diagram representing a chrominance tweak histogram.

The watermark embedder introduces a change in chrominance by balancing R and B tweaks with G tweaks in the opposite direction (see FIG. 18a). The chrominance tweaks can alternate between positive and negative to preserve the average color in the image. FIG. 18a shows an image histogram for a flat color patch, shown by the solid vertical lines in FIG. 18a, after a watermark is applied.

Since luminance can be defined by:

$$L=0.3*R+0.6*G+0.1*B, \text{ then} \tag{17}$$

the change in luminance, deltaL, can be defined by:

$$\text{delta}L=0.3*\text{delta}R+0.6*\text{delta}G+0.1*\text{delta}B, \text{ where deltaR is the change in Red, deltaB is the change in B, and deltaG is the change in green.} \tag{18}$$

deltaL is kept to zero by balancing the R and B tweaks (e.g., a change attributed to a watermark signal) by G tweaks in the opposite direction. For example, a positive tweak of 10 in G is balanced by 14 negative in R and 18 negative in B.

$$\text{delta}L=0.3*(-14)+0.6*(10)+0.1*(-18)=0, \text{ for positive green tweaks,} \tag{19}$$

and $$\text{delta}L=0.3*(14)+0.6*(-10)+0.1*(18)=0, \text{ for negative green tweaks} \tag{20}$$

Thus the average change in luminance over an area with positive and negative tweaks is approximately zero.

Figure 18B:
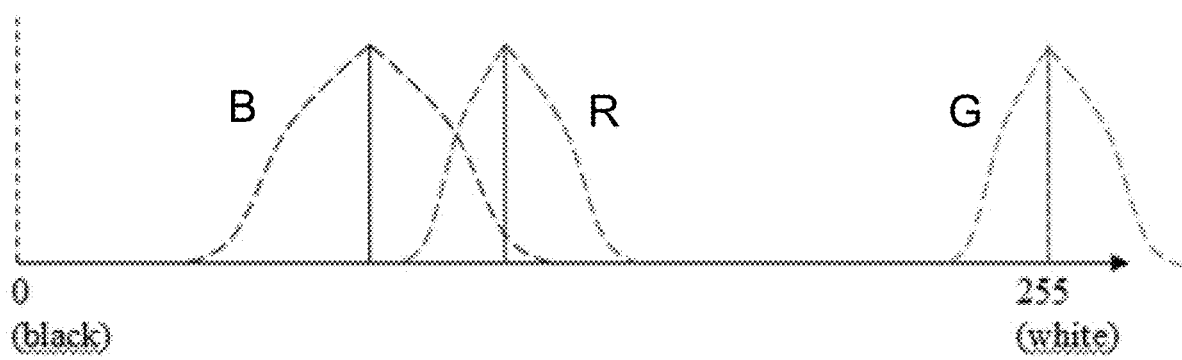
FIG. 18b is a diagram representing a chrominance tweak histogram for a saturated color.

However when one of the colors is clipped at 255 as shown in FIG. 18b, a luminance change can be introduced, since the positive green tweaks are being lost.

The change in luminance then becomes:

$$\text{delta}L=0.3*(-14)+0.6*(0)+0.1*(-18)=-6, \text{ for positive green tweaks,} \tag{21}$$

and $$\text{delta}L=0.3*(14)+0.6*(-10)+0.1*(18)=0, \text{ for negative green tweaks} \tag{22}$$

Thus the average change in luminance over an area with positive and negative tweaks is (−6+0)/2=−3.

A luminance change can be reduced (or limited) by limiting the watermark tweak size by the absolute magnitude of the range available in R, G and B. This is used to calculate a scaling factor for rTweak, gTweak and bTweak. The minimum of these 3 scaling factors can be selected and this scale is applied to the red, green and blue tweaks. (A clipped or saturated threshold can be established to use when other high color values besides 255 are detected. For example, if the value is greater than 85% of the max value then scaling factors are determined.)

Watermark Detector Improvements

Some watermark detectors can be configured to recover a full affine transform of analyzed data, e.g., looking to characterize a known orientation or other watermark component. See, e.g., U.S. Pat. Nos. 6,408,082 and 7,480,393, which are each hereby incorporated herein by reference. This can be extended to obtain a full perspective transform. One extension analyzes correlation peaks in a log-polar domain. In the presence of perspective geometry, a log-polar peak undergoes a spreading. This spreading can be analyzed to obtain clues to the nature of the perspective transform. These clues (e.g., a first estimate of perspective distortion) can be used to correct the imagery to improve the probability of successful detection.

Detection at larger distances from a monitor or display can be achieved by increasing resolution of video capture. When running a watermark detector on high resolution video frames, a multi-resolution detection strategy (e.g., where the watermark detection is performed at multiple resolutions) can be employed to achieve detection over a range of distances. As a pre-process, prior to watermark detection, an image can be zoomed into specific areas and these zoomed in images can be fed to the watermark detector. In another case, low resolution images are combined or stitched together and then provided to the watermark detector. In some cases we can use the super-resolution image generating techniques discussed in U.S. Pat. No. 7,218,751, which is incorporated herein by reference in its entirety, to modify imagery prior to watermark detection.

Video and relatively higher resolution images can be cycled as input to a watermark detector to improve watermark detection. As mentioned above, higher resolution captures provide a greater capability of detection over larger distances. In a mobile environment, a still image capture (or image acquisition) typically offers the highest resolution and, therefore, the relatively larger image capture distance envelope. However, detection using image capture provides only one opportunity (e.g., the still image) for successful detection. In comparison, video capture provides several opportunities for successful detection in the form of multiple video frames that can be used for detection. The best of both worlds can be obtained by cycling through video acquisition and image acquisition. For example, a smartphone may be controlled to first capture video of a display screen, and then snap a still image of the display screen and then capture some more video and another still image of the display screen. Each type of imagery is communicated during or after acquisition to a watermark detector for analysis.

Determining perspective by image analysis can be used as a pre-filter prior to watermark detection. When detecting watermarks displayed on digital displays, the assumption is that there is a rectangular display (e.g., either LED, LCD, projection etc.). A perspective view of the display captured by a camera on the detecting device transforms the rectangular shape of the display into a quadrilateral. Computer vision and image processing techniques can be employed to determine the presence of such quadrilaterals (e.g., corner detection, edge and line detection, determining line intersections, etc.) and estimating the inverse perspective transform required to transform these quadrilaterals back into rectangles. Image data can be transformed according to the inverse perspective transform prior to watermark detection.

Just as pre-distortions can be used at the embedder to condition a watermark signal, as discussed above, pre-distortion can also be used at the detector to improve detection robustness. For example, at the detector distortion of captured imagery would involve attempting detection at multiple resolutions (scales) and distorting the imagery (video frame or captured image) with various amounts of perspective before performing detection. Note that this strategy of cycling through pre-distortions at the detector can be used either instead of, or in addition to, a strategy of pre-distorting a watermark signal at the embedder. When working in concert, the embedder may employ a rough step approach, e.g., changing the perspective distortion by ±25-30 degrees, while the detector employs a smooth step cycle, e.g., distorting imagery by ±5-10 degrees per step.

An audio signal accompanying a video display can be used to help synchronize detector-side distortions of received imagery. For example, the audio signal may indicate the timing or sequence of positive or negative horizontal or vertical perspective distortion of an embedded watermark signal. (In some cases, the display will include or cooperate with a watermark detector, and generate the audio signal based on the detected watermark signal.) The audio signal is preferable imperceptible to a human listener, but detectable by microphone captured audio.

Frame throughput at the detector can be improved to facilitate better detection. For example, the faster each frame (or image) is processed at the detector, generally, the more likely it is that the detector can keep up with the watermark pre-distortions that are displayed at the embedding end. This increases the probability of the detector encountering a suitable frame for detection at any given viewing angle or distance. Faster detection can be enabled by using specialized instruction sets that are available on some mobile device architectures (e.g. SIMD instructions such as ARM NEON instructions), utilizing a GPU for performing detection operations at the detector, and utilizing the GPU for performing geometric distortions, if any, at the detector.

As discussed further in assignee's U.S. patent application Ser. No. 12/640,386 (now U.S. Pat. No. 8,175,617), hereby incorporated herein by reference in its entirety, target patterns may be included in a scene from which, e.g., the distance to, and orientation of, surfaces within the viewing space can be discerned. Such targets thus serve as beacons, signaling distance and orientation information to a camera system. One such target is the TRIPcode, detailed, e.g., in de Ipiña, TRIP: a Low-Cost Vision-Based Location System for Ubiquitous Computing, Personal and Ubiquitous Computing, Vol. 6, No. 3, May, 2002, pp. 206-219.

Figure 16:
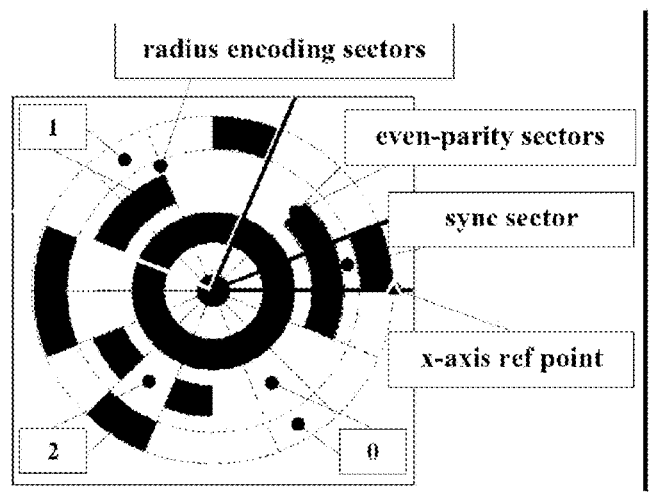
FIG. 16 shows a graphical target, which can be used to provide information associated with image capture distance and image capture perceptive angle.

As detailed in the Ipiña paper, the target (shown in FIG. 16) encodes information including the target's radius, allowing a camera-equipped system to determine both the distance from the camera to the target, and the target's 3D pose. If the target is positioned on a surface in the viewing space (e.g., on a wall), the Ipiña arrangement allows a camera-equipped system to understand both the distance to the wall, and the wall's spatial orientation relative to the camera.

It may be advantageous to conceal the presence of such TRIPcodes. One camouflage method relies on the fact that color printing is commonly performed with four inks: cyan, magenta, yellow and black (CMYK). Normally, black material is printed with black ink. However, black can also be imitated by overprinting cyan and magenta and yellow. To humans, these two techniques are essentially indistinguishable. To a digital camera, however, they may readily be discerned. This is because black inks typically absorb a relatively high amount of infrared light, whereas cyan, magenta and yellow channels do not.

The arrangement just described can be adapted for use with any color printed imagery—not just black regions. Details for doing so are provided in U.S. Pat. No. 7,738,673, which is hereby incorporated herein by reference in its entirety. By such arrangements, TRIPcode targets can be concealed or hidden from human view wherever printing may appear in a visual scene, allowing accurate measurement of certain features and objects within the scene by reference to such targets.

A hidden TRIPcode may be advantageously used to improve watermark detection. For example, a hidden TRIPcode may be encoded in video prior to rendering on a display. A mobile phone or other camera captures video of the display rendering the encoded video. The mobile phone analyzes the captured video to discern details from the TRIPcode. These details include information to allow the mobile phone to discern an image capture range and image capture perspective angle. Armed with this information, the mobile phone warps (e.g., alters or transforms) the captured video to compensate for image capture distance and perspective angle. This warping counteracts the effects of distance and perspective changes. This warped video is then provided to a watermark detector. From the watermark detector's perspective, the video is (relatively) distortion free. The detector searches for a watermark in the warped video.

Although it could be, a TRIPcode (or other target pattern) need not be placed in every video frame. In fact, such a tool could be placed every 10 or more frames. In one embodiment, the watermark detection processes is not initiated until a TRIPcode (or other target pattern) is found. The video data is warped to compensate for distortion, and the warped video is then presented to the watermark detector.

Concluding Remarks

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety. Such documents are incorporated in their entireties, even if cited above in connection with specific of their teachings. These documents disclose technologies and teachings that can be incorporated into the arrangements detailed herein, and into which the technologies and teachings detailed herein can be incorporated.

The methods, processes, components, apparatus and systems described above may be implemented in hardware, software or a combination of hardware and software. For example, the watermark encoding processes and embedders may be implemented in software, firmware, hardware, combinations of software, firmware and hardware, a programmable computer, electronic processing circuitry, and/or by executing software or instructions with a processor or circuitry. Similarly, watermark data decoding or decoders may be implemented in software, firmware, hardware, combinations of software, firmware and hardware, a programmable computer, electronic processing circuitry, and/or by executing software or instructions with a multi-purpose electronic processor, parallel processors or cores, and/or other multi-processor configurations.

The methods and processes described above (e.g., watermark embedders and detectors) also may be implemented in software programs (e.g., written in C, C++, Visual Basic, Java, Python, Tcl, Perl, Scheme, Ruby, executable binary files, etc.) stored in memory (e.g., a computer readable medium, such as an electronic, optical or magnetic storage device) and executed by an electronic processor (or electronic processing circuitry, hardware, digital circuit, etc.).

While one embodiment discusses inverting the polarity in a second color channel (e.g., a 'b' channel), one could also invert the polarity in the first color channel (e.g., an 'a' channel) instead. In such a case, the first color channel is then preferably subtracted from the second color channel.

The particular combinations of elements and features in the above-detailed embodiments are exemplary only; the interchanging and substitution of these teachings with other teachings in this and the incorporated-by-reference patents are also contemplated.

What is claimed is:

1. A method comprising:
   obtaining data representing video;
   using one or more electronic processors, transforming the data representing video by encoding a signal therein, in which the encoding introduces changes to the data representing video over time so as to reduce perceptible changes introduced by the encoding, and in which the encoding comprises first watermarking and second watermarking, which are encoded in corresponding spatial positions of the video,
   in which said transforming yields encoded data, in which the first watermarking utilizes a first embedding bump size, and the second watermarking utilizes a second embedding bump size, in which the first embedding bump size corresponds with a first detection range distance when capturing optical scan data of encoded data, and the second embedding bump size corresponds with a second, larger detection range distance when capturing optical scan data of the encoded data
   and in which portions within the data representing video which host the encoding change over time; and
   providing the encoded data.

2. The method of claim 1 in which use of both the first embedding bump size and the second embedding bump size extends the detection range distance when capturing optical scan data associated with the encoded data.

3. The method of claim 2 in which the optical scan data comprises video data captured from a rendering of the encoded data.

4. The method of claim 1 further comprising preconditioning the signal prior to encoding.

5. The method of claim 1 in which the portions change in terms of pixel area or size.

6. The method of claim 5 in which the portions comprises bumps.

7. The method of claim 6 in which the bumps comprise encoding areas.

8. The method of claim 1 in which the encoding reduces perceptible changes introduced by the encoding by inversing polarity of related adjustments to the data representing video.

9. An apparatus comprising:
   an input to receive data representing video;
   memory storing instructions;

one or more electronic processors configured with said instructions to perform the following:

altering the data representing video by encoding a signal therein, in which the encoding introduces changes to the data representing video over time so as to reduce perceptible changes introduced by the encoding, in which the encoding reduces perceptible changes introduced by the encoding by inversing polarity of related adjustments to the data representing video, and in which the altering yields encoded data, and in which portions within the data representing video which host the encoding change over time; and providing the encoded data.

10. The apparatus of claim 9 in which the encoding comprises first watermarking and second watermarking, which are encoded in corresponding spatial positions of the video, and in which the first watermarking utilizes a first embedding bump size, and the second watermarking utilizes a second embedding bump size, in which the first embedding bump size corresponds with a first detection range distance when capturing optical scan data of a rendering of the encoded data, and the second embedding bump size corresponds with a second, larger detection range distance when capturing optical scan data of a rendering of the encoded data.

11. The apparatus of claim 10 in which use of both the first embedding bump size and the second embedding bump size extends the detection range distance when capturing optical scan data associated with the encoded data.

12. The apparatus of claim 11 in which the optical scan data comprises video data captured from a rendering of the encoded data.

13. The apparatus of claim 9 in which the one or more electronic processors are configured with said instructions to perform preconditioning the signal prior to encoding.

14. The apparatus of claim 9 in which the portions change in terms of pixel area or size.

15. The apparatus of claim 14 in which the portions comprises bumps.

16. The apparatus of claim 15 in which the bumps comprise encoding areas.

* * * * *